US009528235B1

(12) United States Patent
Irving

(10) Patent No.: US 9,528,235 B1
(45) Date of Patent: Dec. 27, 2016

(54) SOLAR POWERED ICE/SNOW MELTING SYSTEM AND ASSOCIATED USE THEREOF

(71) Applicant: Desmond Irving, Rahway, NJ (US)

(72) Inventor: Desmond Irving, Rahway, NJ (US)

( * ) Notice: Subject to any disclaimer, the term of this patent is extended or adjusted under 35 U.S.C. 154(b) by 574 days.

(21) Appl. No.: 14/043,768

(22) Filed: Oct. 1, 2013

Related U.S. Application Data

(60) Provisional application No. 61/708,250, filed on Oct. 1, 2012.

(51) Int. Cl.
| | | |
|---|---|---|
| *F23L 9/00* | (2006.01) | |
| *E01H 5/10* | (2006.01) | |
| *E01C 11/24* | (2006.01) | |
| *F24J 2/36* | (2006.01) | |
| *F24J 2/24* | (2006.01) | |

(52) U.S. Cl.
CPC ............... *E01H 5/10* (2013.01); *E01C 11/24* (2013.01); *F24J 2/243* (2013.01); *F24J 2/36* (2013.01)

(58) Field of Classification Search
CPC ...................................... F24J 2/243; F24J 2/36
USPC ...................................................... 126/271.1
See application file for complete search history.

(56) References Cited

U.S. PATENT DOCUMENTS

| | | | | | |
|---|---|---|---|---|---|
| 3,946,721 | A | * | 3/1976 | Keyes ................... | F24F 5/0046 126/400 |
| 2010/0237307 | A1 | * | 9/2010 | Milburn ................ | E04H 17/143 256/1 |
| 2012/0152319 | A1 | * | 6/2012 | Bailey ..................... | H02S 40/44 136/248 |

FOREIGN PATENT DOCUMENTS

| | | | | |
|---|---|---|---|---|
| FR | 2519127 A1 | * | 7/1983 | ............... F24J 2/243 |
| WO | WO 2012172028 A1 | * | 12/2012 | ............. F24J 2/4638 |

* cited by examiner

*Primary Examiner* — William G Corboy

(57) ABSTRACT

A solar powered snow melting system includes a support member, a solar panel attached to the support member, a housing engaged with the solar panel, and a flexible sheet releasably stored within the housing. Such a flexible sheet has a plurality of heating elements communicatively coupled to the solar panel such that the heating elements are heated by the solar panel. Notably, the flexible sheet is rotated between wound and unwound positions at an interior and an exterior of the housing, respectively. Advantageously, when rotated to the unwound position, the flexible sheet is capable of lying flat along a ground surface and on a railroad track adjacent to an undercarriage of a train.

1 Claim, 3 Drawing Sheets

SOLAR POWERED ICE/SNOW MELTING SYSTEM AND ASSOCIATED USE THEREOF

CROSS REFERENCE TO RELATED APPLICATIONS

This application claims the benefit of U.S. Provisional Application No. 61/708,250 filed Oct. 1, 2012, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

Technical Field

Exemplary embodiment(s) of the present disclosure relate to ice/snow melting systems and, more particularly, to a solar powered ice/snow melting system for use in melting snow and ice that accumulates in public highways, municipal roadways, private driveways, public walkways, parking lots, airports, amusement parks, government facilities, sport venues, railroads, or train stations.

Prior Art

During the winter months, many people can be found outside their home or apartment, laboriously wielding a snow shovel to remove snow from their driveways and walkways. Sometimes the city sends a truck to shovel the streets and drop salt on icy areas but this does not, however, solve the problem of getting from one's front door to the shoveled streets. The task of removing accumulated snow from driveways, walkways, sidewalks and outdoor stairways must be accomplished by use of hard, manual labor, using a snow shovel to scoop up, lift, and heave the snow to the sides. Snow removal in parking lots, streets and similar expansive areas typically requires the use of heavy duty snow plows that are driven by city employees or private contractors. Unfortunately, if snow and ice is not removed from public areas, the result can be that pedestrians can slip on these slick surfaces, potentially sustaining serious injury. Further, parking lots and roadways that are not properly cleared can be hazardous to motorists, with vehicles easily sliding on the ice and resulting in dangerous and sometimes deadly collisions.

Accordingly, a need remains for a solar powered ice/snow melting system in order to overcome prior art shortcomings. The exemplary embodiment(s) satisfy such a need by providing a solar powered ice/snow melting system that is convenient and easy to use, lightweight yet durable in design, versatile in its applications, and designed for use in melting snow and ice that accumulates in public highways, municipal roadways, private driveways, public walkways, parking lots, airports, amusement parks, government facilities, sport venues, railroads, or train stations.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a solar powered snow melting system for melting snow and ice that accumulates in public areas. These and other objects, features, and advantages of the non-limiting exemplary embodiment(s) are provided by a solar powered snow melting system including a support member, a solar panel attached to the support member, a housing engaged with the solar panel, and a flexible sheet releasably stored within the housing. Such a flexible sheet has a plurality of heating elements communicatively coupled to the solar panel such that the heating elements are heated by the solar panel. Notably, the flexible sheet is rotated between wound and unwound positions at an interior and an exterior of the housing, respectively. Advantageously, when rotated to the unwound position, the flexible sheet is capable of lying flat along a ground surface and on a railroad track adjacent to an undercarriage of a train.

In a non-limiting exemplary embodiment, the housing has an access panel attached thereto for permitting ingress and egress of the flexible sheet. Such a housing is located at a lower portion of the solar panel such that the flexible sheet unwinds outwardly and away from the support member and the solar panel.

In a non-limiting exemplary embodiment, the support member is a support panel seated directly on the housing, the support member having an indentation formed on a top surface thereof, the solar panel being seated on the top surface such that the solar panel rises and falls relative to the indentation.

In a non-limiting exemplary embodiment, the housing is portable and maintains the solar panel and the support panel above a ground surface.

In a non-limiting exemplary embodiment, the support member is a fence having vertically oriented first and second posts spaced at opposite sides of the housing such that the flexible sheet is oriented between the first and second posts.

In a non-limiting exemplary embodiment, the first post has a plurality of notches formed along an outer face thereof, wherein the second post has a plurality of fingers formed along an outer face thereof, wherein adjacent ones of the fingers are removably interlocked within adjacent ones of the notches thereby orienting adjacent ones of the posts at an end-to-end configuration.

In a non-limiting exemplary embodiment, the support member is a free standing wall having oppositely disposed first and second legs and a top surface intercalated therebetween, the solar panel being interfitted within an interior perimeter of the free standing wall, the housing being attached to a lower section of the free standing wall.

The present disclosure also includes a method of utilizing a solar powered snow melting system for melting snow and ice that accumulates in public areas. Such a method includes the chronological steps of: providing a support member; providing and attaching a solar panel to the support member; providing and engaging a housing to the solar panel; providing and releasably storing a flexible sheet within the housing, the flexible sheet having a plurality of heating elements communicatively coupled to the solar panel such that the heating elements are heated by the solar panel; rotating the flexible sheet between wound and unwound positions at an interior and an exterior of the housing, respectively; and when rotated to the unwound position, laying the flexible sheet flat along a ground surface and on a railroad track adjacent to an undercarriage of a train.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
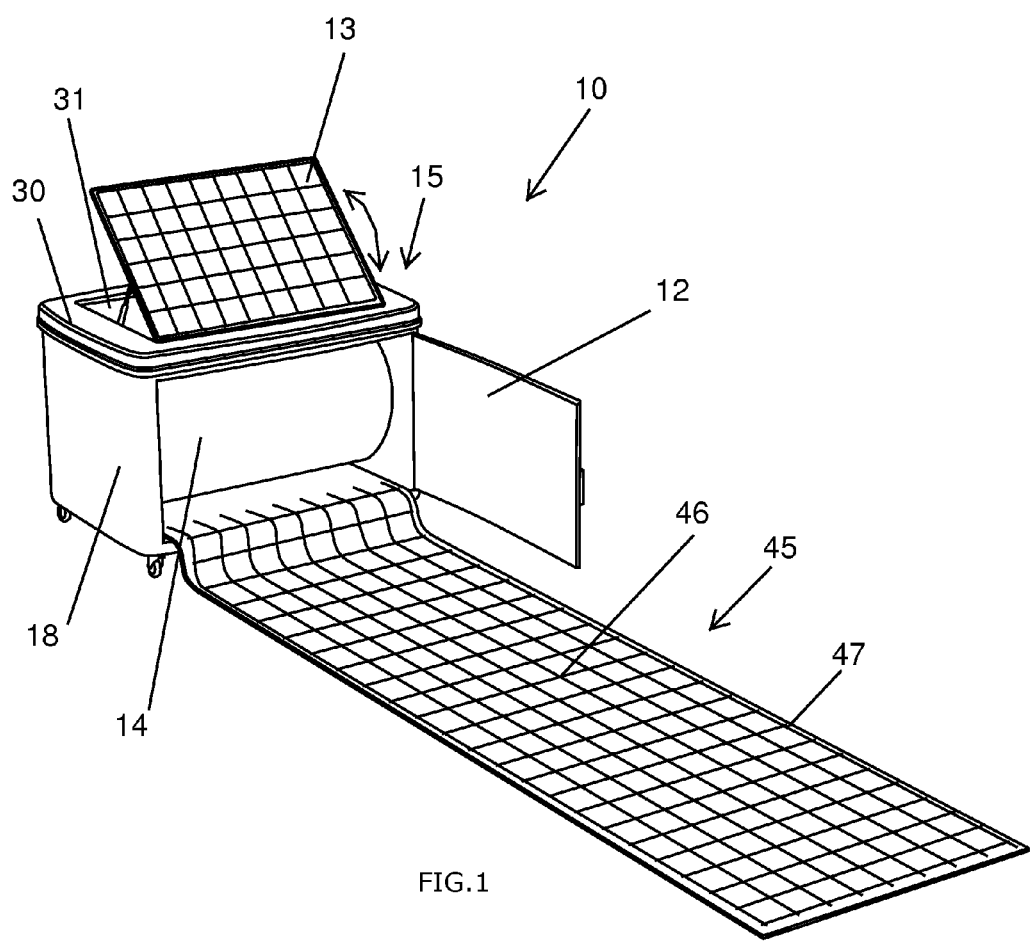
FIG. 1 is a perspective view of a portable solar powered ice/snow melting system for use in public areas such as a train track, for example, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment (s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 2:
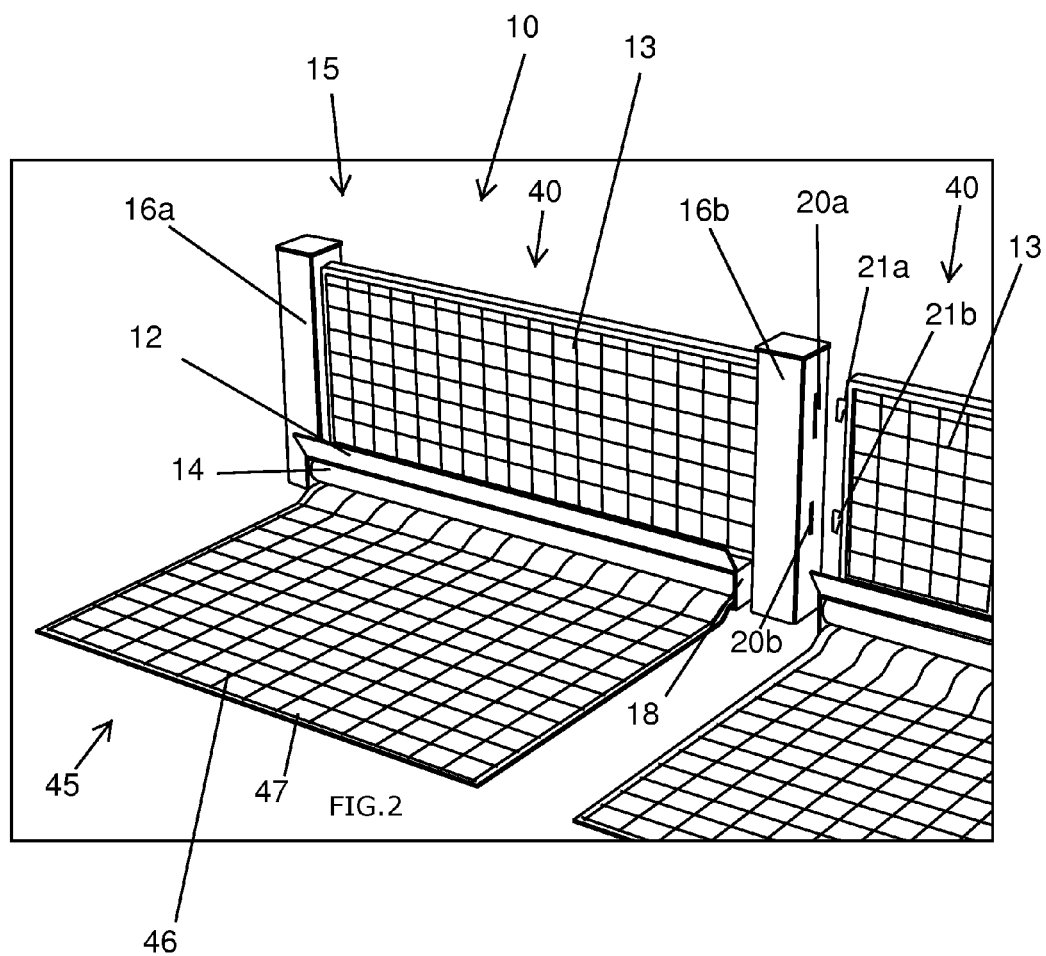
FIG. 2 is a perspective view of a portable solar powered ice/snow melting system for use in public areas such as a train track, for example, in accordance with a non-limiting exemplary embodiment.
Figure 3:
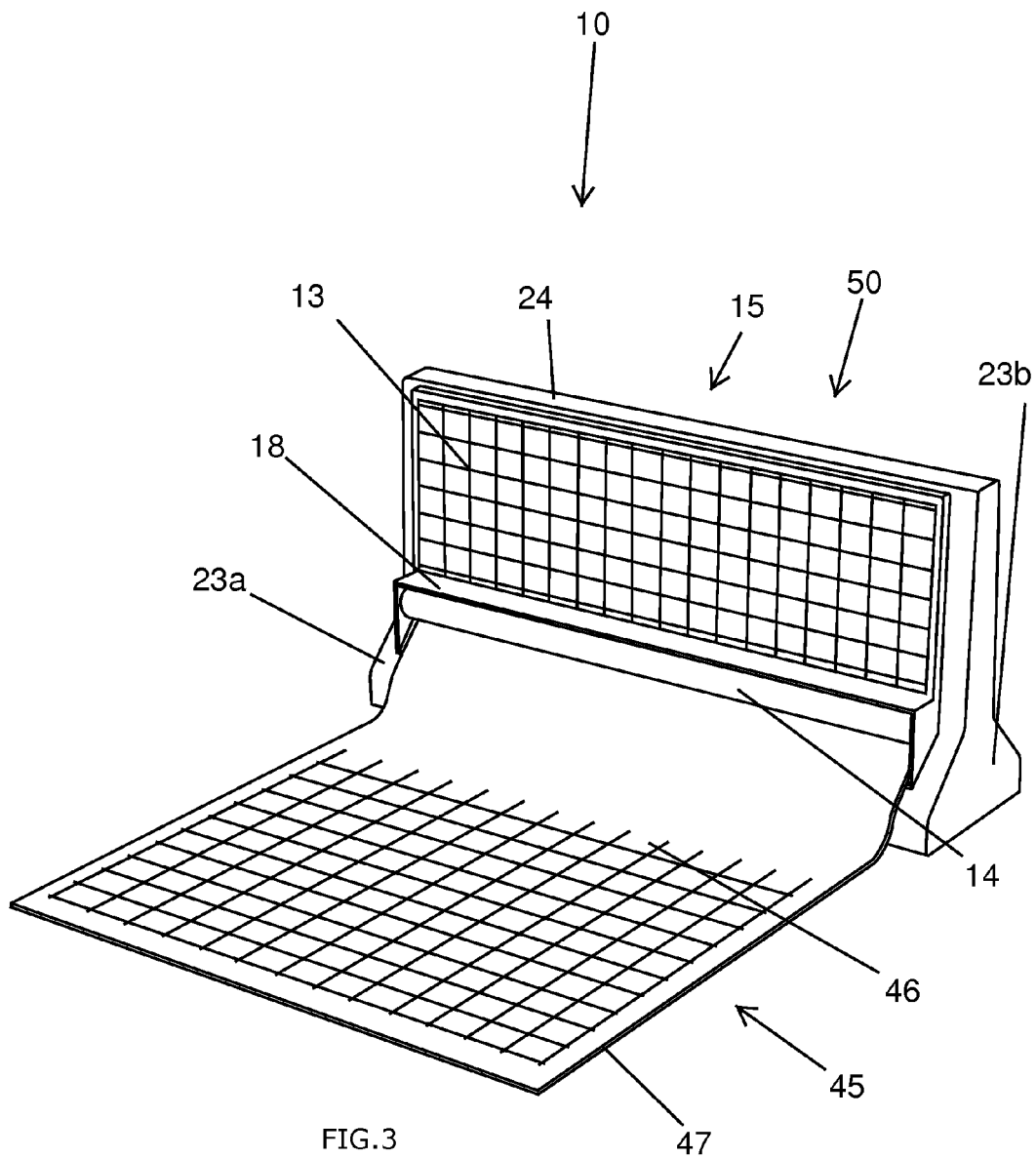
FIG. 3 is a perspective view of a portable solar powered ice/snow melting system for use in public areas such as a train track, for example, in accordance with a non-limiting exemplary embodiment.

The non-limiting exemplary embodiments of the present disclosure is referred to generally in FIGS. 1-3 and is intended to provide a solar powered ice/snow melting system 10 for use in melting snow and ice that accumulates in public highways, municipal roadways, private driveways, public walkways, parking lots, airports, amusement parks, government facilities, sport venues, railroads, or train stations. It should be understood that the exemplary embodiment may be used to melt snow/ice in many different locations, and should not be limited to any particular location described herein.

Referring to FIGS. 1-3 in general, a solar powered snow melting system 10 for melting snow and ice that accumulates in public areas, is disclosed. The solar powered snow melting system 10 includes a support member 15, a solar panel 13 attached to the support member 15, a housing 18 engaged with the solar panel 13, and a flexible sheet 45 releasably stored within the housing 18. Such a flexible sheet 45 has a plurality of heating elements 46 communicatively coupled to the solar panel 13 such that the heating elements 46 are heated by the solar panel 13. One skilled in the art understands conventions mechanisms may be employed for providing power from the solar panel 13 to the heating elements 46. Notably, the flexible sheet 45 is rotated between wound 14 and unwound 47 positions at an interior and an exterior of the housing 18, respectively. Advantageously, when rotated to the unwound 47 position, the flexible sheet 45 is capable of lying flat along a ground surface and on a railroad track adjacent to an undercarriage of a train.

In a non-limiting exemplary embodiment, the housing 18 has an access panel 12 attached thereto for permitting ingress and egress of the flexible sheet 45. Such a housing 18 is located at a lower portion of the solar panel 13 such that the flexible sheet 45 unwinds outwardly and away from the support member 15 and the solar panel 13.

In a non-limiting exemplary embodiment, the support member 15 is a support panel 30 seated directly on the housing 18. Such a support member 15 has an indentation 31 formed on a top surface thereof. The solar panel 13 is thereby seated on the top surface such that the solar panel 13 rises and falls relative to the indentation 31.

In a non-limiting exemplary embodiment, the housing 18 is portable and maintains the solar panel 13 and the support panel 30 above a ground surface.

In a non-limiting exemplary embodiment, the support member 15 is a fence 40 having vertically oriented first and second posts 16a, 16b spaced at opposite sides of the housing 18 such that the flexible sheet 45 is oriented between the first and second posts 16a, 16b.

In a non-limiting exemplary embodiment, the first post 16a has a plurality of notches 20a, 20b formed along an outer face thereof. The second 16b has a plurality of fingers 21a, 21b formed along an outer face thereof. In this manner, adjacent ones of the fingers 21a, 21b are removably interlocked within adjacent ones of the notches 20a, 20b thereby orienting adjacent ones of the posts 16a, 16b—fence 40—at an end-to-end configuration.

In a non-limiting exemplary embodiment, the support member 15 is a free standing wall 50 having oppositely disposed first and second legs 23a, 23b and a top surface 24 intercalated therebetween. Notably, the solar panel 13 is interfitted within an interior perimeter of the free standing wall 50 and the housing 18 is attached to a lower section of the free standing wall 50.

The present disclosure also includes a method of utilizing a solar powered snow melting system 10 for melting snow and ice that accumulates in public areas. Such a method includes the chronological steps of: providing a support member 15; providing and attaching a solar panel 13 to the support member 15; providing and engaging a housing 18 to the solar panel 13; providing and releasably storing a flexible sheet 45 within the housing 18 wherein the flexible sheet 45 has a plurality of heating elements 46 communicatively coupled to the solar panel 13 such that the heating elements 46 are heated by the solar panel 13; rotating the flexible sheet 45 between wound 14 and unwound 47 positions at an interior and an exterior of the housing 18, respectively; and when rotated to the unwound 47 position, laying the flexible sheet 45 flat along a ground surface and on a railroad track adjacent to an undercarriage of a train.

In a non-limiting exemplary embodiment, the solar powered ice/snow melting system 10 utilizes solar energy to melt snow and ice that accumulates in private driveways, public walkways, and parking lots. In this manner, both home and business owners would possess the means by which to eradicate snow and ice accumulation without ever needing to shovel or call for a plow again. The solar powered ice/snow melting system 10 may be a "solar wall" 50 or fencing 40, to be installed in areas with heavy snow fall, with the unit erected in large parking lots, sports stadiums, airports, recreational areas, commercial structures and government offices, to name a few options. The length and height of the solar wall would depend on the size of the area in which system 10 is installed. The surface of the solar wall would be covered in a series of solar panels that utilize harvested energy to convert snow and ice to water, via the application of heat. Like standard solar powered fixtures, these panels would use standard solar cells in a very straightforward application.

Power is supplied via the solar cells. A single solar cell produces a maximum of 0.45 volts and a varying amount of current depending on the size of the cell and the amount of light striking the surface. These solar cells could be wired in series, and as with standard solar cells, four wired cells would produce approximately 1.8 volts of electricity and a maximum of about 100 milliamps in full, bright sunlight. Solar powered units typically utilize an outside power such a battery or electricity for facilitation of the harnessed power. A backup power source such as an electrical generator or rechargeable batteries for powering the unit, may be included.

In a non-limiting exemplary embodiment, system 10 would emit enough heat to melt all accumulated snow and ice, converting it to water. As this system 10 would more than likely be installed prior to snow fall, it could also prevent snow and ice from accumulating in the first place. In addition to solar walls and fencing, system 10 could be installed along railroad tracks, with a "snow melting unit" to be installed along the undercarriage of train cars. In such a case, the energy utilized to drive the train engine would also serve to heat the train tracks, thus melting snow and ice on contact.

In a non-limiting exemplary embodiment, other design applications for system 10 would include manually operated snow removal equipment such as snow blowers, heated snow shovels and hand held tools for use in removing ice from hard to reach or tight fitting areas such as steps, auto windshields and the like. These devices could employ internal heating elements, powered via solar energy, or could operate on electrical or battery power, as well as gasoline or diesel fuel.

There are several significant benefits and advantages associated with this clever product invention. For example, system 10 offers consumers an effective means of eliminating ice and snow from parking lots, driveways and walkways. A multifaceted system that utilizes solar panels built into walls and fencing to eradicate snow and ice from expansive areas, system 10 would eliminate the need to spend precious hours laboriously scooping or plowing snow. In this manner, system 10 would eradicate one of the most difficult and arduous tasks faced by people who live in snow-prone areas. Acting quickly to melt ice and snow via the application of heat, system 10 would enable consumers to traverse public parking lots, sidewalks and other areas safely and with ease.

With system 10 covering the area from a garage or parking area all the way to the road entrance, working men and women would be able get out on the road in a quick and expedient manner. In addition, retail and other public establishments could employ this practical tool to prevent the accumulation of large piles snow and ice, making the sidewalks and parking lots in front of their businesses safer for their customers and passersby. This would eliminate the possibility of costly litigation brought against the businesses as a result of slips and falls. Importantly, this clever system would operate on free solar power, and not require expensive use of and waste of electricity. With system 10 also including a number of manually operated tools for household use, use of this product would enable users to clear their driveways, walkways and steps in a simple and expeditious fashion.

While non-limiting exemplary embodiment(s) has/have been described with respect to certain specific embodiment (s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A method of utilizing a solar powered snow melting system for melting snow and ice that accumulates in public areas, said method comprising the chronological steps of:
    providing a support member;
    providing and attaching a solar panel to said support member;
    providing and engaging a housing to said solar panel;
    providing and releasably storing a flexible sheet within said housing, said flexible sheet having a plurality of heating elements communicatively coupled to said solar panel such that said heating elements are heated by said solar panel;
    rotating said flexible sheet between wound and unwound positions at an interior and an exterior of said housing, respectively; and
    when rotated to said unwound position, laying said flexible sheet flat along a ground surface and on a railroad track adjacent to an undercarriage of a train.

* * * * *